(12) United States Patent
Kim et al.

(10) Patent No.: US 8,834,005 B2
(45) Date of Patent: Sep. 16, 2014

(54) BACKLIGHT ASSEMBLY AND DISPLAY APPARATUS HAVING THE SAME

(75) Inventors: Heu-Gon Kim, Yongin-si (KR); Jin-Hee Park, Cheonan-si (KR); Sung-Kyu Shim, Seoul (KR); Jae-Hyun Kim, Asan-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 324 days.

(21) Appl. No.: 13/310,354

(22) Filed: Dec. 2, 2011

(65) Prior Publication Data
US 2012/0201044 A1 Aug. 9, 2012

(30) Foreign Application Priority Data
Feb. 7, 2011 (KR) .......................... 10-2011-0010657

(51) Int. Cl.
*F21V 7/04* (2006.01)
*F21V 8/00* (2006.01)

(52) U.S. Cl.
CPC ................ *G02B 6/002* (2013.01); *G02B 6/009* (2013.01)
USPC ............................. 362/633; 362/97.2; 349/58

(58) Field of Classification Search
CPC ...... G02B 6/00; G02B 6/0001; G02B 6/0011; G02B 6/0081; G02B 6/0088; G02B 6/009; G02B 6/0091
USPC ............. 362/97.1–97.4, 632–634; 349/58–60
See application file for complete search history.

(56) References Cited

U.S. PATENT DOCUMENTS 7,729,589 B2 6/2010 Chou et al.
2010/0165235 A1 7/2010 Lee et al.

FOREIGN PATENT DOCUMENTS

KR 10-2009-0043799 5/2009
KR 10-2009-0128693 12/2009

OTHER PUBLICATIONS

English Abstract for Publication No. 10-2009-0043799.
English Abstract for Publication No. 10-2009-0128693.

*Primary Examiner* — Jason Moon Han
(74) *Attorney, Agent, or Firm* — F. Chau & Associates, LLC

(57) ABSTRACT

A backlight assembly includes a light guide plate, a light source, a mold and a main frame. The light guide plate includes a first surface and a second surface extending from the first surface. The light source is disposed adjacent to the first surface of the light guide plate. The mold includes an upper portion, a lower portion and a side portion. The side portion connects to the upper and lower portions to form a receiving space, and the receiving space receives the light source and the first surface of the light guide plate. The main frame includes side walls and an upper wall extending from an upper portion of the side walls, and the mold is disposed in an opening below the upper wall.

18 Claims, 4 Drawing Sheets

BACKLIGHT ASSEMBLY AND DISPLAY APPARATUS HAVING THE SAME

CROSS-REFERENCE TO RELATED APPLICATION

This application claims priority under 35 U.S.C. §119 to Korean Patent Application No. 2011-0010657, filed on Feb. 7, 2011, the disclosure of which is incorporated by reference herein in its entirety.

BACKGROUND

1. Technical Field

The present invention relates to a backlight assembly and a display apparatus having the backlight assembly, and more particularly, to a backlight assembly used for a flat display apparatus and a flat display apparatus having the backlight assembly.

2. Discussion of the Related Art

A display apparatus typically includes a display panel that displays images and a backlight assembly that provides light to the display panel.

The backlight assembly may use various light sources. For example, a light emitting diode (LED) may be used to provide light to the display panel.

The backlight assembly may be an edge-illumination type backlight assembly or a direct-illumination type backlight assembly. The light source in an edge-illumination type backlight assembly is disposed adjacent to a light guide plate that guides the light. For example, the light source and a side of the light guide plate incident to the light source may be disposed in a mold, which is then received into and fixed within a main frame. This configuration may decrease the overall thickness of the frame. The light guide plate may be fixed to the main frame using, for example, an adhesive disposed on a side of the light guide plate opposing the side that is incident to the light. Alternatively, an additional mold fixing member may be formed such that the light guide plate is tightly attached to the side of the light guide plate that is incident to the light.

However, the shape of the light guide plate may be deformed, or the adhesive or additional mold fixing member may be damaged due to, for example, high temperature or humidity. When the light guide plate is deformed, or the adhesive or additional mold are damaged, a gap may be created between the light guide plate and the light source, and light may leak through the gap. As a result, the total luminance and/or the uniformity of color may be decreased, and thus, the overall quality of the display may be deceased.

SUMMARY

Exemplary embodiments of the present invention provide a backlight assembly for decreasing light-leakage and enhancing luminance.

Exemplary embodiments of the present invention further provide a display apparatus having the backlight assembly.

According to an exemplary embodiment of the present invention, a backlight assembly includes a light guide plate, a light source, a mold and a main frame. The light guide plate includes a first surface and a second surface extending from the first surface. The light source is disposed adjacent to the first surface of the light guide plate. The mold includes an upper portion, a lower portion and a side portion. The side portion connects to the upper portion and the lower portion to form a receiving space, and the receiving space receives the light source and the first surface of the light guide plate. The main frame includes side walls and an upper wall extending from an upper portion of the side walls. The mold is disposed in an opening below the upper wall.

In an exemplary embodiment, the backlight assembly may further include a hole formed in the upper portion of the mold and a protruding portion disposed on a lower surface of the upper wall of the main frame. The protruding portion is inserted into the hole.

In an exemplary embodiment, the hole may be formed in an area of the upper portion of the mold that does not overlap an area of the receiving space in which the light source is disposed.

In an exemplary embodiment, the protruding portion of the upper wall may be attached to the light guide plate through the hole formed in the upper portion of the mold.

In an exemplary embodiment, the backlight assembly may further include an adhesive attaching the protruding portion of the upper wall to the light guide plate.

In an exemplary embodiment, the protruding portion of the upper wall and the hole formed in the upper portion of the mold may each have a bar shape and extend substantially parallel with the first surface of the light guide plate.

In an exemplary embodiment, the backlight assembly may further include a plurality of holes formed in the upper portion of the mold, and a plurality of protruding portions disposed on a lower surface of the upper wall of the main frame. The protruding portions are inserted into the holes.

In an exemplary embodiment, the light guide plate may further include a corner surface disposed between the first surface and the second surface, and the light source may be disposed adjacent to the corner surface.

In an exemplary embodiment, the light source may have an angle between about 45° and about 60° with respect to the first surface of the light guide plate.

In an exemplary embodiment, the backlight assembly may further include a fixing plate. The light source may be mounted on the fixing plate and the fixing plate may be received into the receiving space of the mold.

In an exemplary embodiment, the backlight assembly may further include a light blocking layer disposed under the upper portion of the mold. The light blocking layer may partially cover the light source and the light guide plate.

In an exemplary embodiment, the backlight assembly may further include a light reflecting plate disposed under the light blocking plate and partially received into the receiving space of the mold.

In an exemplary embodiment, the backlight assembly may further include an optical sheet disposed over the light guide plate.

According to an exemplary embodiment of the present invention, a display apparatus includes a display panel configured to display an image, and a backlight assembly. The backlight assembly includes a light guide plate, a light source, a mold and a main frame. The light guide plate includes a first surface and a second surface extending from the first surface. The light source is disposed adjacent to the first surface of the light guide plate. The mold includes an upper portion, a lower portion and a side portion. The side portion connects to the upper and lower portions to form a receiving space, and the receiving space receives the light source and the first surface of the light guide plate. The main frame includes side walls and an upper wall extending from an upper portion of the side walls. The mold is disposed in an opening below the upper wall.

In an exemplary embodiment, the upper wall of the main frame may support a side of the display panel.

In an exemplary embodiment, the display apparatus may further include a top cover disposed on the display panel. The top cover may cover the upper and side portions of the mold and the side walls of the main frame.

In an exemplary embodiment, the display apparatus may further include a hole formed in the upper portion of the mold, and a protruding portion disposed on a lower surface of the upper wall of the main frame. The protruding portion may be inserted into the hole.

In an exemplary embodiment, the protruding portion of the upper wall may be attached to the light guide plate through the hole formed in the upper portion of the mold.

In an exemplary embodiment, the protruding portion of the upper wall and the hole formed in the upper portion of the mold may each have a bar shape and extend substantially parallel with the first surface of the light guide plate.

In an exemplary embodiment, the display apparatus may further include a plurality of holes formed in the upper portion of the mold, and a plurality of protruding portions disposed on a lower surface of the upper wall of the main frame. The protruding portions may be inserted into the holes.

According to exemplary embodiments of the present invention, the upper wall of the main frame and the light guide plate are stably fixed to each other through the hole of the upper portion of the mold. As a result, the light guide plate is prevented from being spaced apart from the light source by more than a predetermined distance, and a gap between the light guide plate and the upper portion of the mold is prevented from occurring. Accordingly, a gap between the light source and the light guide plate may be uniformly maintained, a light-leakage may be prevented, and luminance may be enhanced.

In addition, the upper wall of the main frame and the light guide plate are fixed to each other through the hole formed through the upper portion of the mold. As a result, a substantially thin and narrow combined structure for housing the display apparatus may be formed.

According to an exemplary embodiment of the present invention, a mold for a backlight assembly includes a lower portion, an upper portion, a side portion connected to the upper portion and the lower portion, and a hole formed through the upper portion. The lower portion, the upper portion, and the side portion form a receiving space having a U-shape, and the receiving space is configured to receive a light source and a light guide plate. The hole formed through the upper portion is shaped and dimensioned to receive a protruding portion of an upper wall of a main frame.

In an exemplary embodiment, the height of the receiving space is substantially equal to the sum of the thickness of the light guide plate and the thickness of a light reflecting plate.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Figure 1:
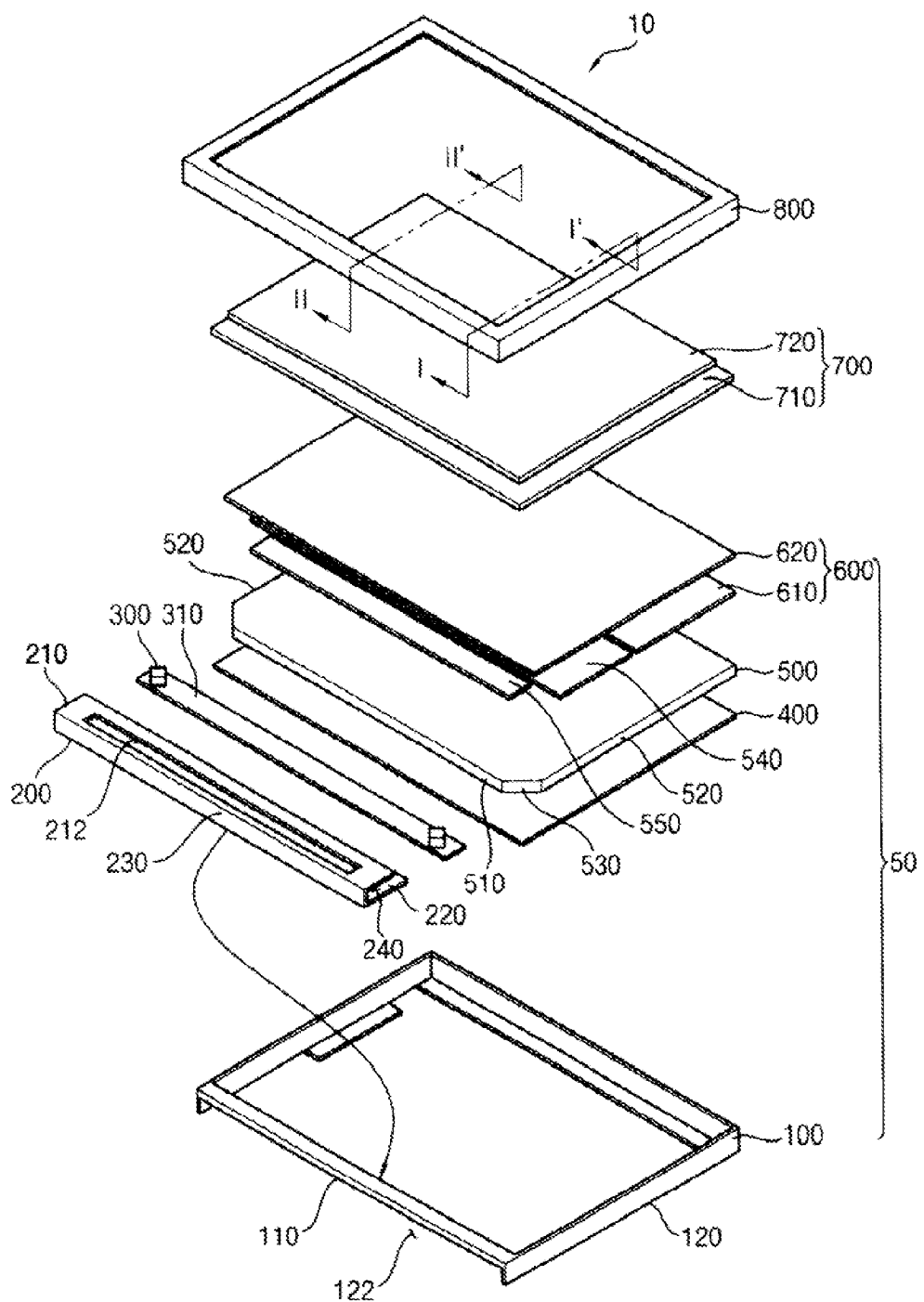
FIG. 1 is an exploded perspective view illustrating a display apparatus according to an exemplary embodiment of the present invention.

Exemplary embodiments of the present invention will be described more fully hereinafter with reference to the accompanying drawings. Like reference numerals may refer to like elements throughout the accompanying drawings.

It will be understood that when an element is referred to as being disposed or formed "on," "over," "under," "adjacent to," "below" or "between" another element, it may be directly on, over, under, adjacent to, below or between the other element or intervening elements may be present. Similarly, it will be understood that when an element is referred to as "covering" another element, it may be directly covering the other element or intervening elements may be present.

FIG. 1 is an exploded perspective view illustrating a display apparatus according to an exemplary embodiment of the present invention.

Referring to FIG. 1, the display apparatus 10 includes a backlight assembly 50, a display panel 700 and a top cover 800. The backlight assembly 50 includes a main frame 100, a mold 200, light sources 300, a light reflecting plate 400, a light guide plate 500 and optical sheets 600.

The display panel 700 displays an image in response to driving and data signals provided to the display panel 700. The display panel 700 is disposed over the backlight assembly 50, and displays an image using light provided from the backlight assembly 50. The display panel 700 may include an array substrate 710, an opposing substrate 720 facing the array substrate 710 and a liquid crystal layer (not shown) disposed between the array substrate 710 and the opposing substrate 720. According to an embodiment, a chip driving the display panel 700 is directly mounted on the array substrate 710, or a driving pad (not shown) connected to an external driving circuit is formed on the array substrate 710.

According to an embodiment, the light sources 300 each include a light emitting diode (LED) emitting light through an external driving power supply. The LED emits point light having directivity along a direction. For example, the LED emits the point light spreading out from a point. The LED may be mounted on the backlight assembly 50, and the backlight assembly 50 may include a fixing plate 310 electrically connected to the external driving power supply. The light sources 300 are disposed at a side of the light guide plate 500. For example, according to an embodiment, the light sources 300 are adjacent to a first surface 510 of the light guide plate 500.

The light guide plate 500 converts an incident light having an optical dispersion of a point light source or an optical dispersion of a line light source to an exit light having an optical dispersion of a face light source. The light guide plate 500 includes the first surface 510 adjacent to the light sources 300 and second surfaces 520 extending from the first surface 510. The light guide plate 500 includes corner surfaces 530 formed by chamfering a corner between the first surface 510 and the second surfaces 520, respectively. The light sources 300 are adjacent to the corner surfaces 530. For example, according to an embodiment, the light sources 300 are disposed at the corner surfaces 530, and are inclined by an angle with respect to the first surface 510 of the light guide plate 500. According to an embodiment, the angle is between about 20° and about 70°, however the angle is not limited thereto. For example, an angle between about 45° and about 60° may be used to enhance the uniformity of luminance.

According to the exemplary embodiment shown in FIG. 1, the light sources 300 are disposed at the corner surfaces 530, however the location of the light sources 300 is not limited thereto. For example, the light sources 300 may include light sources 300 disposed at the corner surfaces 530, as well as light sources 300 disposed at the first surface 510 of the light guide plate 500. According to an embodiment, the light sources 300 are disposed at uniform intervals.

The light reflecting plate 400 is disposed under the light guide plate 500, and reflects the light exiting from the light guide plate 500. For example, the light incident to the light guide plate 500 may partially exit the light guide plate 500 from a lower side of the light guide plate 500 rather than from an upper side of the light guide plate 500. This light is reflected towards the upper side of the light guide plate 500 by the light reflecting plate 400.

The mold 200 includes an upper portion 210, a lower portion 220 and a side portion 230 connecting the upper portion 210 to the lower portion 220. The upper portion 210, side portion 230, and lower portion 220 of the mold 200 form a "U" shape when viewed from a side of the mold 200. A height of a receiving space 240 formed by the upper portion 210, the side portion 230 and the lower portion 220 of the mold 200 is substantially the same as the sum of the thickness of the light guide plate 500 and the thickness of the light reflecting plate 400. The light sources 300, a portion of the light guide plate 500 and a portion of the light reflecting plate 400 are received into the receiving space 240. For example, the light sources 300 mounted on the fixing plate 310 are received into the receiving space 240 of the mold 200. The light guide plate 500 and the light reflecting plate 400 are then received into the receiving space 240 of the mold 200. Accordingly, the light sources 300, a portion of the light guide plate 500 and a portion of the light reflecting plate 400 are received into the receiving space 240 of the mold 200. Hereinafter, a combined structure is explained in more detail with reference to FIG. 2.

The upper portion 210 of the mold 200 includes a hole 212 formed through the upper portion 210. According to the exemplary embodiment shown in FIGS. 1 and 2, the hole 212 is substantially parallel with the first surface 510 of the light guide plate 500, and has a bar shape, however the hole 212 is not limited thereto.

The main frame 100 includes side walls 120 and an upper wall 110 formed at a first portion 122 of the main frame 100. The first portion 122 of the main frame 100 includes an opening below the upper wall 110 and between the side walls 120, as shown in FIG. 1. According to an embodiment, the main frame 100 has a quadrilateral shape having another opening at a central portion. An edge of the light guide plate 500 may be supported by the main frame 100. The light reflecting plate 400 and the light guide plate 500 inserted in the mold 200 are disposed at the side walls 120 of the main frame 100. The upper wall 110 of the main frame 100 extends from an upper portion of the side walls 120, and the mold 200 is disposed in an opening under the upper wall 110. Hereinafter, the combined structure is explained in more detail with reference to FIGS. 2 and 3.

The optical sheets 600 are disposed over the light guide plate 500, and may enhance optical characteristics of the light exiting from the light guide plate 500. For example, according to an embodiment, the optical sheets 600 include a prism sheet 610 and a diffusion sheet 620. The prism sheet 610 has prism patterns (not shown) formed on one side of the prism sheet 610, and changes a direction of the light exiting from the light guide plate 500 such that the light is substantially perpendicular to the light guide plate 500. The diffusion sheet 620 diffuses light exiting from the prism sheet 610 to enhance luminance.

Figure 2:
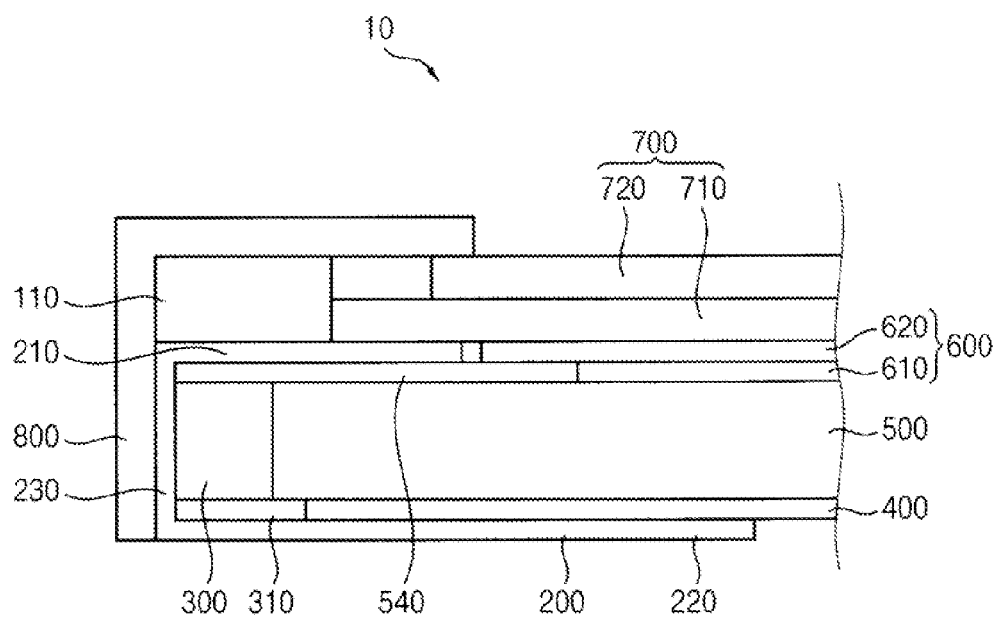
FIG. 2 is a cross-sectional view taken along line I-I' in FIG. 1.
Figure 3:
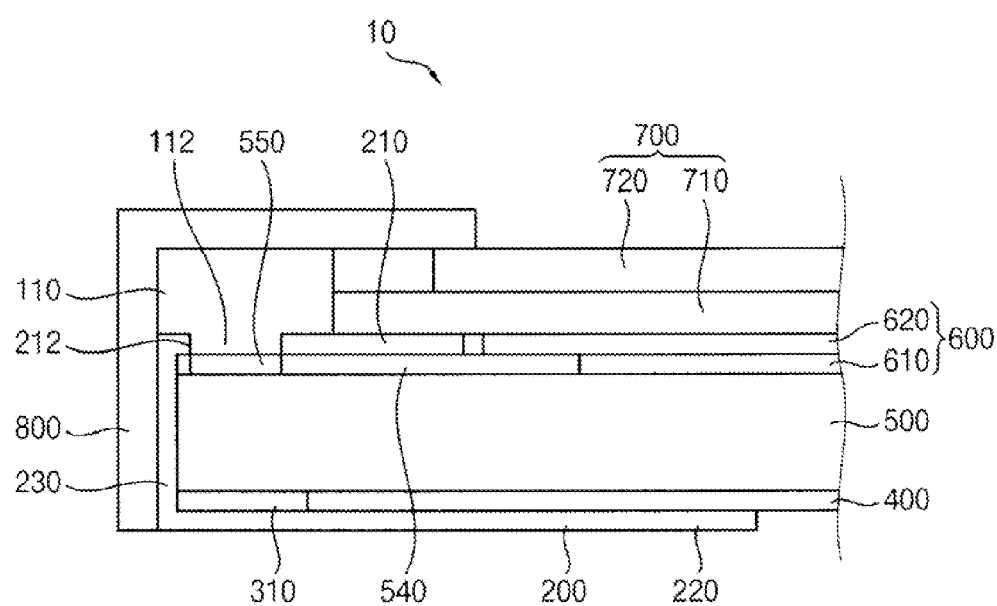
FIG. 3 is a cross-sectional view taken along line II-II' in FIG. 1.

The top cover 800 is disposed over the display panel 700, and covers the upper portion 210 and the side portion 230 of the mold 200, and the side walls 120 of the main frame 100. For example, the top cover 800 has an "L" shape when viewed from the side as shown in FIGS. 2 and 3, and a central portion of the top cover 800 is open to display the image displayed on the display panel 700 as shown in FIG. 1. The top cover 800 is disposed on the display panel 700 and attached to the main frame 100. For example, the top cover 800 may be attached to the main frame 100 using a screw (not shown).

FIG. 2 is a cross-sectional view taken along line I-I' shown in FIG. 1.

Referring to FIGS. 1 and 2, the light sources 300 mounted on the fixing plate 310 and the fixing plate 310 are received into the receiving space 240 of the mold 200. The light reflecting plate 400 and the light guide plate 500 are further received into the receiving space 240 such that they are adjacent to and supported by the light sources 300. For example, according to an embodiment, the light guide plate 500 is adjacent to and supported by a side of the light sources 300, and the light reflecting plate 400 is adjacent to and supported by a side of the fixing plate 310. As can be seen, the light reflecting plate 400 and the light guide plate 500 are positioned in a tight configuration against the fixing plate 310 and the light sources 300, respectively. Accordingly, the mold 200 receives and stably houses the light sources 300, the fixing plate 310, the light reflecting plate 400 and the light guide plate 500.

As mentioned above, the light sources 300, the fixing plate 310, the light reflecting plate 400 and the light guide plate 500 are received into the receiving space 240 of the mold 200. The mold 200 is then received into the main frame 100. For example, the mold 200 is disposed in the opening under the upper wall 110 of the main frame 100, and the light reflecting plate 400 and the light guide plate 500 are disposed adjacent to and supported by the side walls 120 of the main frame 100. According to an embodiment, an additional adhesive 550 is attached to an opposite side of the first surface 510 of the light guide plate 500 to fix the light guide plate 500 to the main frame 100.

The optical sheets 600 are disposed over the light guide plate 500. For example, the prism sheet 610 and diffusion sheet 620 may be sequentially loaded on the light guide plate 500.

According to an embodiment, the display panel 700 is disposed on the light guide plate 500, and a side of the display panel 700 is supported by the upper wall 110 of the main frame 100.

According to an embodiment, a light blocking layer 540 is formed under the upper portion 210 of the mold 200 to block the light from the light sources 300. For example, according to an embodiment, the light blocking layer 540 makes contact with a lower surface of the upper portion 210 of the mold 200, which faces the light guide plate 500. The light blocking layer 540 blocks light from leaking through a gap between the upper portion 210 of the mold 200 and the light guide plate 500. According to an embodiment, the width of the light blocking layer 540 is larger than the width of the upper portion 210 of the mold 200. The light blocking layer 540 is formed under the upper mold 210 to cover the light sources 300 and a portion of the light guide plate 500.

Hereinafter, the hole 212 formed through the upper portion 210 of the mold 200 and a protruding portion 112 formed on a lower surface of the upper wall 110 of the main frame 100 are explained in more detail with reference to FIG. 3.

FIG. 3 is a cross-sectional view taken along line II-II' shown in FIG. 1.

Referring to FIG. 3, a cross-sectional view of an area of the display apparatus 10 in which the light sources 300 are not disposed is illustrated. The hole 212 formed through the upper portion 210 of the mold 200 and the protruding portion 112 formed on the lower surface of the upper wall 110 of the main frame 100 are illustrated in FIG. 3.

The light guide plate 500 is received into the receiving space 240 of the mold 200, and the first surface 510 of the light guide plate 500 makes contact with the side portion 230 of the mold 200. The hole 212 is formed through the upper portion 210 of the mold 200. The light sources 300 and the light guide plate 500 are disposed in the mold 200, and the hole 212 is formed in an area of the mold 200 in which the light sources 300 are not disposed. For example, the hole 212 does not overlap with the light sources 300. Since the hole 212 does not overlap with the light sources 300, light may be prevented from leaking from the light sources 300. Further, the combined structure formed from the upper wall 110 of the main frame 100 and the light guide plate 500 results in a stable frame structure for stably fixing the light guide plate 500, as discussed in more detail below.

The protruding portion 112 is formed on the lower surface of the upper wall 110 of the main frame 100. The protruding portion 112 is inserted into the hole 212 of the upper portion 210 of the mold 200. According to an embodiment, the protruding portion 112 has a shape such that the protruding portion 112 fits tightly into the hole 212. For example, the protruding portion 112 and the hole 212 are formed in an area in which the light sources 300 are not disposed, and extend substantially parallel with the first surface 510 of the light guide plate 500. According to the exemplary embodiment shown in FIGS. 1 to 3, each of the protruding portion 112 and the hole 212 have a bar shape, however the shape of each is not limited thereto. For example, the shape of each of the protruding portion 112 and the hole 212 may be changed according to the number of the light sources 300 and the size of the mold 200.

According to an embodiment, a height of the protruding portion 112 of the upper wall 110 is substantially the same as the depth of the hole 212 of the upper portion 210 of the mold 200. As a result, when the upper wall 110 is combined with the mold 200, the protruding portion 112 of the upper wall 110 is tightly attached to the light guide plate 500. For example, the protruding portion 112 of the upper wall 110 and the light guide plate 500 are attached to each other by the adhesive 550. The adhesive 550 may be, for example, a double-sided tape.

As mentioned above, the upper wall 110 of the main frame 100 is attached to the light guide plate 500 through the hole 212 of the upper portion 210 of the mold 200, and the light guide plate 500 is stably fixed within the mold 200. Thus, the light guide plate 500 is prevented from being separated from the light sources 300 and from being displaced from the upper portion 210 of the mold 200. Accordingly, even though the light guide plate 500 absorbs heat and may be deformed, the light guide plate 500 is stably fixed, and the gap between the light sources 300 and the light guide plate 500 is uniformly maintained. As a result, light-leakage may be prevented and luminance may be enhanced.

Fixing the upper wall 110 of the main frame 100 and the light guide plate 500 using the hole 212 formed through the upper portion 210 of the mold 200 results in a substantially thin narrow combined structure for housing the light guide plate 500.

Figure 4:
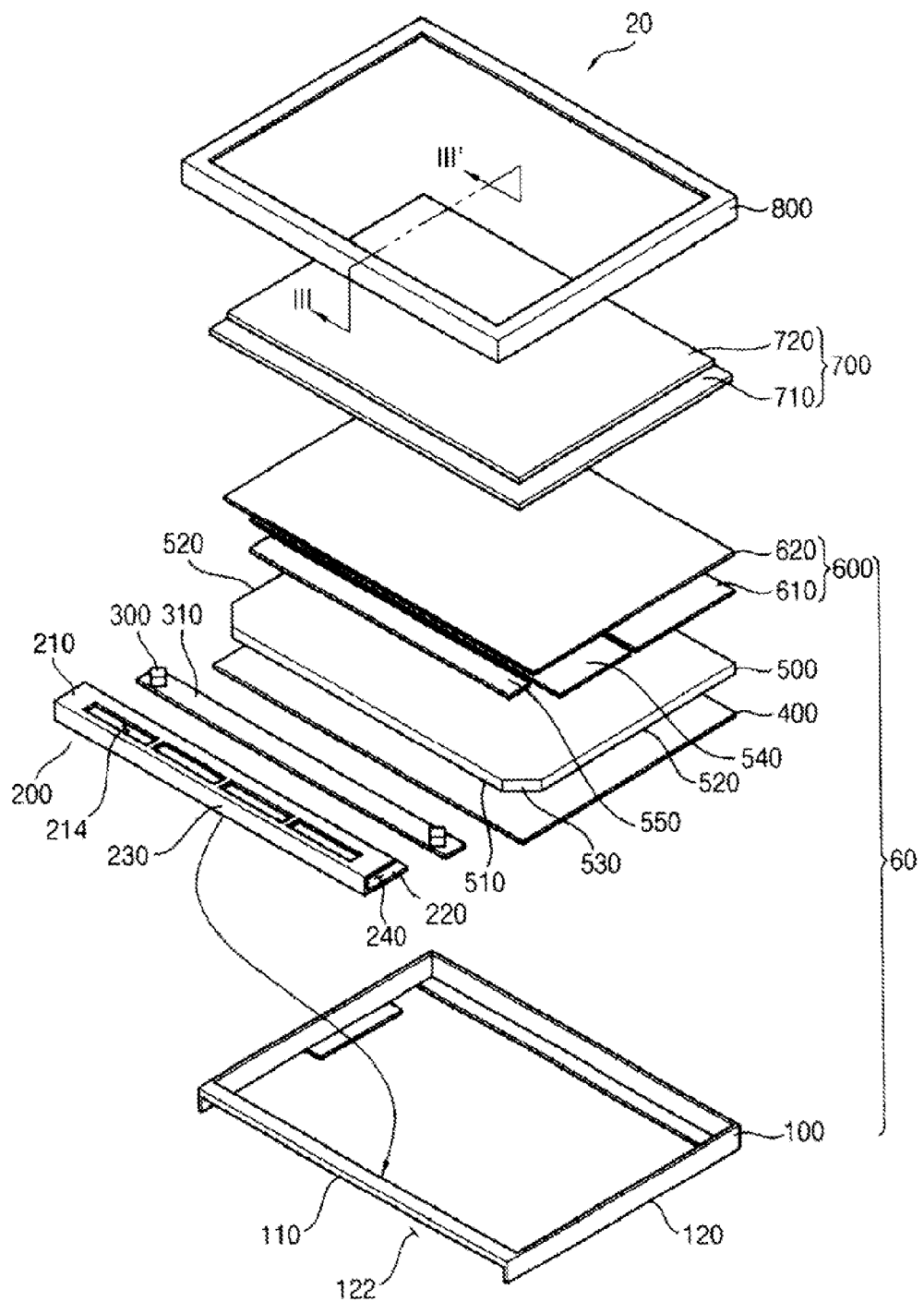
FIG. 4 is an exploded perspective view illustrating a display apparatus according an exemplary embodiment of the present invention.

FIG. 4 is a cross-sectional view illustrating a display apparatus according to an exemplary embodiment of the present invention.

Figure 5:
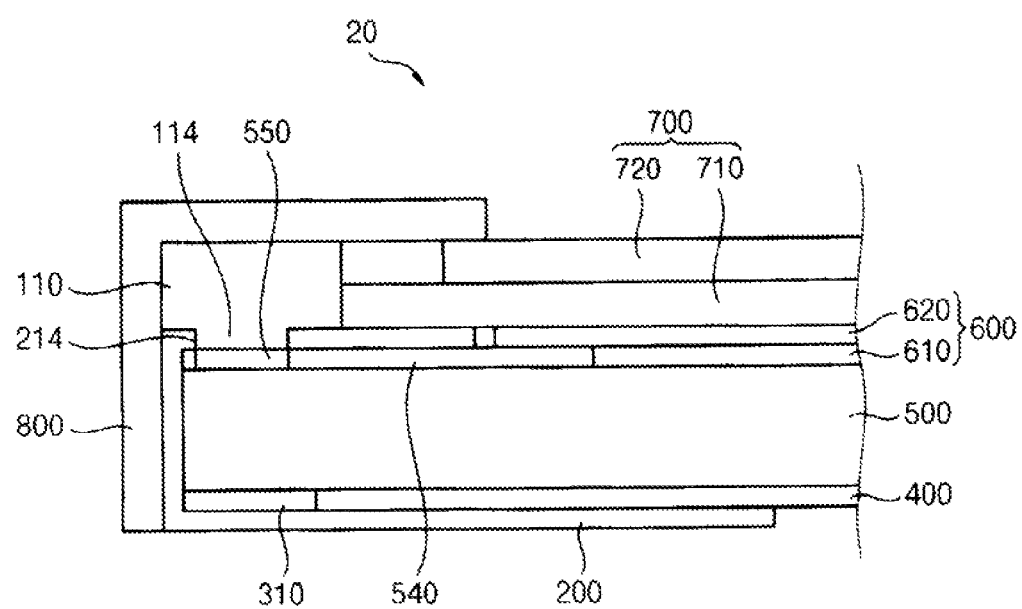
FIG. 5 is a cross-sectional view taken along line III-III' in FIG. 4.

The display apparatus 20 according to the exemplary embodiment shown in FIGS. 4 and 5 is substantially the same as the display apparatus shown in FIGS. 1 to 3, except for a plurality of holes 214 formed through the upper portion 210 of the mold 200 and a plurality of protruding portions 112 formed on a lower surface of the upper wall 110 of the main frame 100. Thus, the same reference numerals are used to refer to like elements as those described with reference to FIGS. 1 to 3.

Referring to the exemplary embodiment in FIGS. 4 and 5, the display apparatus 20 includes a backlight assembly 60, a display panel 700 and a top cover 800. The backlight assembly 60 includes a main frame 100, a mold 200, light sources 300, a light reflecting plate 400, a light guide plate 500 and optical sheets 600.

The mold 200 includes an upper portion 210, a lower portion 220 and a side portion 230 connecting the upper portion 210 to the lower portion 220. The upper portion 210, side portion, 230 and lower portion 220 of the mold 200 form a "U" shape when viewed from a side of the mold 200. The height of a receiving space 240 formed by the upper portion 210, the side portion 230 and the lower portion 220 of the mold 200 is substantially the same as the sum of the thickness of the light guide plate 500 and the thickness of the light reflecting plate 400. The light sources 300, a portion of the light guide plate 500 and a portion of the light reflecting plate 400 are received into the receiving space 240.

According to the exemplary embodiment shown in FIGS. 4 and 5, a plurality of holes 214 is formed through the upper portion 210 of the mold 200. The plurality of holes 214 is substantially parallel with the first surface 510 of the light guide plate 500 received into the receiving space 240. Each of the plurality of holes 214 may have various shapes such as, for example, a quadrilateral shape.

The main frame 100 includes side walls 120 and the upper wall 110 formed at a first portion 122. The first portion 122 of the main frame 100 includes an opening below the upper wall 110 and between the side walls 120, as shown in FIG. 4. The main frame 100 has a quadrilateral shape having an opening at a central portion. An edge of the light guide plate 500 may be supported by the main frame 100. The light reflecting plate 400 and the light guide plate 500 received into the receiving space 240 of the mold 200 are disposed at the side walls 120 of the main frame 100. The upper wall 110 of the main frame 100 extends from the upper portion of the side walls 120, and the mold 200 is disposed in an opening under the upper wall 110.

A plurality of protruding portions 114 is formed on a lower surface of the upper wall 110 of the main frame 100. The protruding portions 114 are respectively inserted into the holes 214 formed through the upper portion 210 of the mold 200. The number of the protruding portions 114 is substantially the same as the number of holes 214, and the shape of each of the protruding portions 114 is substantially the same as that the shape of the holes 214. As a result, the protruding portions 114 fit tightly in the holes 214.

The height of each of the protruding portions 114 of the upper wall 110 is substantially the same as the depth of each of the holes 214 of the upper portion 210 of the mold 200. As a result, when the upper wall 110 is combined with the mold 200, the protruding portions 114 of the upper wall 110 are tightly attached to the light guide plate 500. For example, according to an embodiment, the protruding portions 114 and the light guide plate 500 are attached to each other by an adhesive 550. The adhesive 550 may be, for example, double-sided tape.

As mentioned above, the upper wall 110 of the main frame 100 is attached to the light guide plate 500 through the holes 214 of the upper portion 210 of the mold, and the light guide plate 500 is stably fixed within the mold 200. Thus, the light guide plate 500 is prevented from being separated from the light sources 300 and from being displaced from the upper portion 210 of the mold 200. Accordingly, the gap between the light sources 300 and the light guide plate 500 is uniformly maintained, and light-leakage may be prevented and luminance may be improved.

Fixing the upper wall 110 of the main frame 100 and the light guide plate 500 using the holes 214 formed through the upper portion 210 of the mold 200 results in a substantially thin and narrow combined structure for housing the light guide plate 500.

In addition, there may be a uniform distance between the holes 214 formed through the upper portion 210 of the mold 200. Since the upper wall 110 and the light guide plate 500 are fixed through the holes 214, the light guide plate 500 is stably fixed, even though the light guide plate 500 may be deformed as it absorbs heat.

According to exemplary embodiments of the present invention, the upper wall 110 of the main frame 100 and the light guide plate 500 are stably fixed to each other through the hole 212, or the plurality of holes 214 of the upper portion 210 of the mold 200. As a result, the light guide plate 500 is prevented from being spaced apart from the light sources 300 by more than a predetermined distance, and a gap between the light guide plate 500 and the upper portion 210 of the mold 200 is prevented from occurring. Accordingly, a gap between the light sources 300 and the light guide plate 500 is uniformly maintained, light-leakage may be prevented, and luminance may be enhanced. In addition, the upper wall 110 of the main frame 100 and the light guide plate 500 are fixed to each other through the hole 212, or the plurality of holes 214 formed through the upper portion 210 of the mold 200. As a result, a substantially thin and narrow combined structure for housing the display apparatus may be formed.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A backlight assembly, comprising:
   a light guide plate comprising a first surface and a second surface;
   a light source disposed adjacent to the first surface of the light guide plate;
   a first receiving part comprising an upper portion having at least one hole, a lower portion and a side portion, wherein the side portion connects to the upper portion and the lower portion to form a receiving space, and the receiving space receives the light source and a portion of the light guide plate; and
   a second receiving part comprising side walls and an upper wall extending from an upper portion of the side walls, the upper wall being disposed on the upper portion of the first receiving part and having at least one protruding portion on a bottom thereof inserted into the at least one hole.

2. The backlight assembly of claim 1, wherein the at least one hole does not overlap the light source.

3. The backlight assembly of claim 1, wherein the at least one protruding portion of the upper wall is attached to the light guide plate.

4. The backlight assembly of claim 3, further comprising an adhesive attaching the at least one protruding portion of the upper wall to the light guide plate.

5. The backlight assembly of claim 1, wherein the at least one protruding portion of the upper wall and the at least one hole formed in the upper portion of the first receiving part respectively have a bar shape and extend substantially parallel with the first surface of the light guide plate.

6. The backlight assembly of claim 1, wherein
   the at least one hole includes a plurality of holes formed in the upper portion of the first receiving part; and
   the at least one protruding portion includes a plurality of protruding portions disposed on a lower surface of the upper wall of the second receiving part, wherein the protruding portions are inserted into the holes, respectively.

7. The backlight assembly of claim 1, wherein the light guide plate further comprises a corner surface disposed between the first surface and the second surface, and the light source is disposed adjacent to the corner surface.

8. The backlight assembly of claim 7, wherein the corner surface is inclined by an angle between about 45° and about 60° with respect to the first surface of the light guide plate.

9. The backlight assembly of claim 1, further comprising a fixing plate, wherein the light source is mounted on the fixing plate and the fixing plate is received into the receiving space of the first receiving part.

10. The backlight assembly of claim 1, further comprising a light blocking layer disposed under the upper portion of the first receiving part, wherein the light blocking layer partially covers the light source and the light guide plate.

11. The backlight assembly of claim 1, further comprising a light reflecting plate disposed under the light guide plate and partially received into the receiving space of the first receiving part.

12. The backlight assembly of claim 1, further comprising an optical sheet disposed over the light guide plate.

13. A display apparatus, comprising:
   a display panel configured to display an image; and
   a backlight assembly, comprising:
      a light guide plate comprising a first surface and a second surface;
      a light source disposed adjacent to the first surface of the light guide plate;
      a first receiving part comprising an upper portion having at least one hole, a lower portion and a side portion, wherein the side portion connects to the upper portion and the lower portion to form a receiving space, and the receiving space receives the light source and a portion of the light guide plate; and
      a second receiving part comprising side walls and an upper wall extending from an upper portion of the side walls, the upper wall being disposed on the upper portion of the first receiving part and having at least one protruding portion on a bottom thereof inserted into the at least one hole.

14. The display apparatus of claim 13, wherein the upper wall of the second receiving part supports the display panel.

15. The display apparatus of claim 13, further comprising a top cover disposed on the display panel, wherein the top cover covers the upper and side portions of the first receiving part and the side walls of the second receiving part.

16. The display apparatus of claim 13, wherein the at least one protruding portion of the upper wall is attached to the light guide plate through the at least one hole formed in the upper portion of the first receiving part.

17. The display apparatus of claim 13, wherein the at least one protruding portion of the upper wall and the at least one hole formed in the upper portion of the first receiving part respectively have a bar shape and extend substantially parallel with the first surface of the light guide plate.

18. The display apparatus of claim 13, wherein
the at least one hole includes a plurality of holes formed in the upper portion of the first receiving part; and
the at least one protruding portion includes a plurality of protruding portions disposed on a lower surface of the upper wall of the second receiving part, wherein the protruding portions are inserted into the holes.

\* \* \* \* \*